(12) United States Patent
Uzhinsky et al.

(10) Patent No.: US 8,420,267 B2
(45) Date of Patent: Apr. 16, 2013

(54) METHODS AND SYSTEMS FOR PRODUCING HYDROGEN AND SYSTEM FOR PRODUCING POWER

(75) Inventors: Ighor K. Uzhinsky, Springfield, VA (US); Fernando Aguirre, North Ogden, UT (US); Anthony G. Castrogiovanni, Manorville, NY (US)

(73) Assignee: Alliant Techsystems Inc., Arlington, VA (US)

( * ) Notice: Subject to any disclaimer, the term of this patent is extended or adjusted under 35 U.S.C. 154(b) by 560 days.

(21) Appl. No.: 12/581,735

(22) Filed: Oct. 19, 2009

(65) Prior Publication Data

US 2010/0111823 A1     May 6, 2010

Related U.S. Application Data

(60) Provisional application No. 61/110,354, filed on Oct. 31, 2008.

(51) Int. Cl.
*C01B 3/04*     (2006.01)
*B01J 7/00*     (2006.01)
*H01M 8/06*     (2006.01)

(52) U.S. Cl.
USPC .............. 429/416; 48/61; 422/129; 422/240; 423/648.1

(58) Field of Classification Search ............... 423/648.1; 422/240, 241, 129; 48/61; 429/416
See application file for complete search history.

(56) References Cited

U.S. PATENT DOCUMENTS

| | | | | |
|---|---|---|---|---|
| 3,002,822 A | * | 10/1961 | Leslie | 422/240 |
| 3,103,782 A | | 9/1963 | Olah et al. | |
| 4,157,927 A | * | 6/1979 | Chew et al. | 149/22 |
| 4,235,841 A | * | 11/1980 | Zimmerman | 422/112 |
| 4,248,831 A | * | 2/1981 | Hughes | 422/242 |
| 4,284,879 A | * | 8/1981 | Eveson et al. | 219/383 |
| 4,315,786 A | | 2/1982 | English et al. | |
| 5,158,755 A | * | 10/1992 | Higgins et al. | 422/206 |

(Continued)

FOREIGN PATENT DOCUMENTS

| WO | 0218267 A1 | 3/2002 |
|---|---|---|
| WO | 2008118437 A2 | 10/2008 |
| WO | 2009138629 A1 | 11/2009 |

OTHER PUBLICATIONS

International Search Report for International Application No. PCT/US2009/061171 dated Jan. 26, 2010 (4 pages).

(Continued)

*Primary Examiner* — Wayne Langel
(74) *Attorney, Agent, or Firm* — TraskBritt

(57) ABSTRACT

Provided herein are methods and systems of producing hydrogen using ammonia borane, which has a high hydrogen density while being stable and easily stored. Ammonia borane may be exothermically reacted with a strong oxidizer, such as a mixture of hydrogen peroxide and water. The reaction between ammonia borane and the strong oxidizer may occur spontaneously and may produce heat. Unreacted ammonia borane may be exposed to and thermally decomposed using the heat produced during the exothermic reaction between ammonia borane and the strong oxidizer. The heat may be retained by performing the reactions in a vessel or reactor including a material capable of retaining the heat. A high gravimetric hydrogen yield is obtained from the reaction of ammonia borane with hydrogen peroxide and the thermal decomposition of unreacted ammonia borane. Hydrogen production using the methods and systems may yield a high gravimetric hydrogen content of at least about 10%.

24 Claims, 4 Drawing Sheets

U.S. PATENT DOCUMENTS

| | | | |
|---|---|---|---|
| 6,342,186 B1 * | 1/2002 | Wingfield et al. | 422/241 |
| 6,534,033 B1 | 3/2003 | Amendola et al. | |
| 6,932,847 B2 | 8/2005 | Amendola et al. | |
| 7,105,033 B2 | 9/2006 | Strizki et al. | |
| 7,214,439 B2 | 5/2007 | Ortega et al. | |
| 7,261,748 B2 | 8/2007 | Jones et al. | |
| 7,282,073 B2 | 10/2007 | Petillo et al. | |
| 7,285,142 B1 * | 10/2007 | Mohajeri et al. | 48/61 |
| 7,329,470 B2 * | 2/2008 | Adams et al. | 429/416 |
| 2005/0266281 A1 * | 12/2005 | Adams et al. | 429/17 |
| 2007/0151153 A1 | 7/2007 | Xu et al. | |
| 2007/0243122 A1 | 10/2007 | Ramachandran et al. | |
| 2007/0277436 A1 * | 12/2007 | Jones et al. | 48/61 |
| 2009/0274613 A1 * | 11/2009 | Hamilton et al. | 423/648.1 |

OTHER PUBLICATIONS

Written Opinion of the International Searching Authority for International Application No. PCT/US2009/061171 dated Jan. 26, 2010 (6 pages).

Mohajeri, Nahid, et al., "Hydrolytic Cleavage of Ammonia Borane Complex for Hydrogen Production," WHEC 16, Lyon, France, pp. 1-6, Jun. 13-16, 2006.

Mohajeri, Nahid, et al., "Hydrolytic cleavage of ammonia-borane complex for hydrogen production," Journal of Power Sources, vol. 167, pp. 482-485, 2007.

Raman, R.K., et al., "A Direct Borohydride/Hydrogen Peroxide Fuel Cell with Reduced Alkali Crossover," Fuel Cells, vol. 7, No. 3, pp. 225-231, 2007.

T-Raissi, Ali, "Technoeconomic Analysis of Area II Hydrogen Production—Part II, Hydrogen from Ammonia and Ammonia-Borane Complex for Fuel Cell Applications," Proceedings of the 2002 U.S. DOE Hydrogen Program Review, pp. 1-17, 2002.

Xiong, Zhitao, et al., "Synthesis of sodium amidoborane (NaNH2BH3) for hydrogen production," Energy & Environmental Science, vol. 1, No. 3, pp. 360-363, Sep. 2008.

* cited by examiner

METHODS AND SYSTEMS FOR PRODUCING HYDROGEN AND SYSTEM FOR PRODUCING POWER

CROSS-REFERENCE TO RELATED APPLICATION

This application claims the benefit of U.S. Provisional Patent Application Ser. No. 61/110,354, filed Oct. 31, 2008, for "Methods and Systems for Producing Hydrogen and System for Producing Power," the entire disclosure of which is hereby incorporated herein.

TECHNICAL FIELD

Embodiments of the invention generally relate to methods and systems for producing hydrogen and for producing power, more specifically to high-yield, high-purity hydrogen production using ammonia borane.

BACKGROUND

Hydrogen is an important energy source as it reacts with oxygen to release energy with the only byproduct being water. Hydrogen is gaining importance as a non-carbon dioxide-based, renewable fuel, often referred to as a "clean fuel," because it can be reacted with oxygen in hydrogen-consuming devices, such as a fuel cell or combustion engine, to produce energy and water. As a result, the use of hydrogen as a fuel effectively solves many environmental problems associated with the use of petroleum based fuels. Safe and efficient storage of hydrogen gas is, therefore, essential for many applications that can use hydrogen. In particular, minimizing volume and weight of the hydrogen storage are important for portable hydrogen production and power generation.

Several methods of storing hydrogen currently exist but are either inadequate or impractical for wide-spread consumer applications. For example, hydrogen can be stored in liquid form at very low temperatures. Liquid storage, however, provides a volumetric density of about 70 grams of hydrogen per liter and, thus, does not provide a sufficient amount of hydrogen for portable hydrogen and power generation. In addition, the energy consumed in liquefying hydrogen gas is about 30% of the energy available from the resulting hydrogen. Finally, liquid hydrogen is not safe or practical for most consumer applications.

Compounds that store hydrogen have also shown potential as high capacity hydrogen sources. However, such compounds may be limited by the amount of hydrogen they can store, and by their weight. Ammonia borane ($H_3NBH_3$) is a low molecular weight solid hydrogen storage material containing a significant percent of hydrogen (about 19.6 percent by weight). At room temperature, ammonia borane is a white crystalline solid, which is stable in both water and air. While the most efficient means of producing hydrogen from ammonia borane is by thermal decomposition, or thermolysis, there are several problems that make this process difficult to perform. Specifically, ammonia borane may begin to decompose at temperatures above 85° C., however, higher temperatures are needed to release a substantial amount of hydrogen contained in the ammonia borane. Although the overall process of thermally decomposing ammonia borane is exothermic, heat is required to initiate the reactions. Moreover, thermal decomposition of ammonia borane involves competing reactions that may result in formation of undesirable byproducts, such as borazine, which may poison conventional fuel cells during power generation. Thus, many challenges remain that must be overcome to provide efficient and practical use of ammonia borane.

Due to the challenges associated with thermal decomposition of ammonia borane, much of the present research has shifted to derivatives thereof, such as sodium amidoborane ($NaNH_2BH_3$) and sodium borohydride ($NaBH_4$). Unfortunately, such derivatives have a substantially lower gravimetric hydrogen concentration in comparison to ammonia borane.

In view of the above, there is a need in the art for methods and systems for producing hydrogen for power generation and other applications.

BRIEF SUMMARY OF THE INVENTION

In some embodiments, the present invention includes methods that may be used to produce hydrogen. The method may include reacting ammonia borane with an oxidizer to produce hydrogen and heat. The oxidizer may include a mixture of hydrogen peroxide and water at a volumetric ratio of from about 30:70 to about 90:10. A ratio of the ammonia borane to the oxidizer may be between about 0.4 to about 1.2. An amount of the heat produced by reacting ammonia borane with the oxidizer may be retained and utilized to decompose at least a portion of the unreacted ammonia borane, producing additional hydrogen. The amount of oxidizer may be controlled to produce heat, reaching temperatures higher than 85° C.

In additional embodiments, the present invention includes systems for producing hydrogen. The systems include a reactor configured for reacting ammonia borane and an oxidizer to produce hydrogen and heat and an arrangement within the reactor configured for storing the ammonia borane and for retaining an amount of the heat produced by reacting the ammonia borane with the oxidizer sufficient to decompose unreacted ammonia borane. The arrangement may include a sample container comprising a ceramic material. The reactor may include an aperture positioned over the sample container, the aperture providing access to the ammonia borane.

In additional embodiments, the present invention includes systems for producing power. The systems include a reactor for reacting an oxidizer and ammonia borane to produce hydrogen and heat. The reactor is configured to retain the heat for thermally decomposing ammonia borane to produce additional hydrogen. The reactor further includes at least one apparatus for purifying the hydrogen and one apparatus for converting the hydrogen to power, such as a fuel cell.

BRIEF DESCRIPTION OF THE DRAWINGS

While the specification uses illustrative examples to particularly point out and distinctly describe that which is regarded as embodiments of the present invention, the advantages of this invention may be more broadly ascertained from the following description of the invention when read in conjunction with the accompanying drawings in which.

DETAILED DESCRIPTION OF THE INVENTION

Figure 1A:
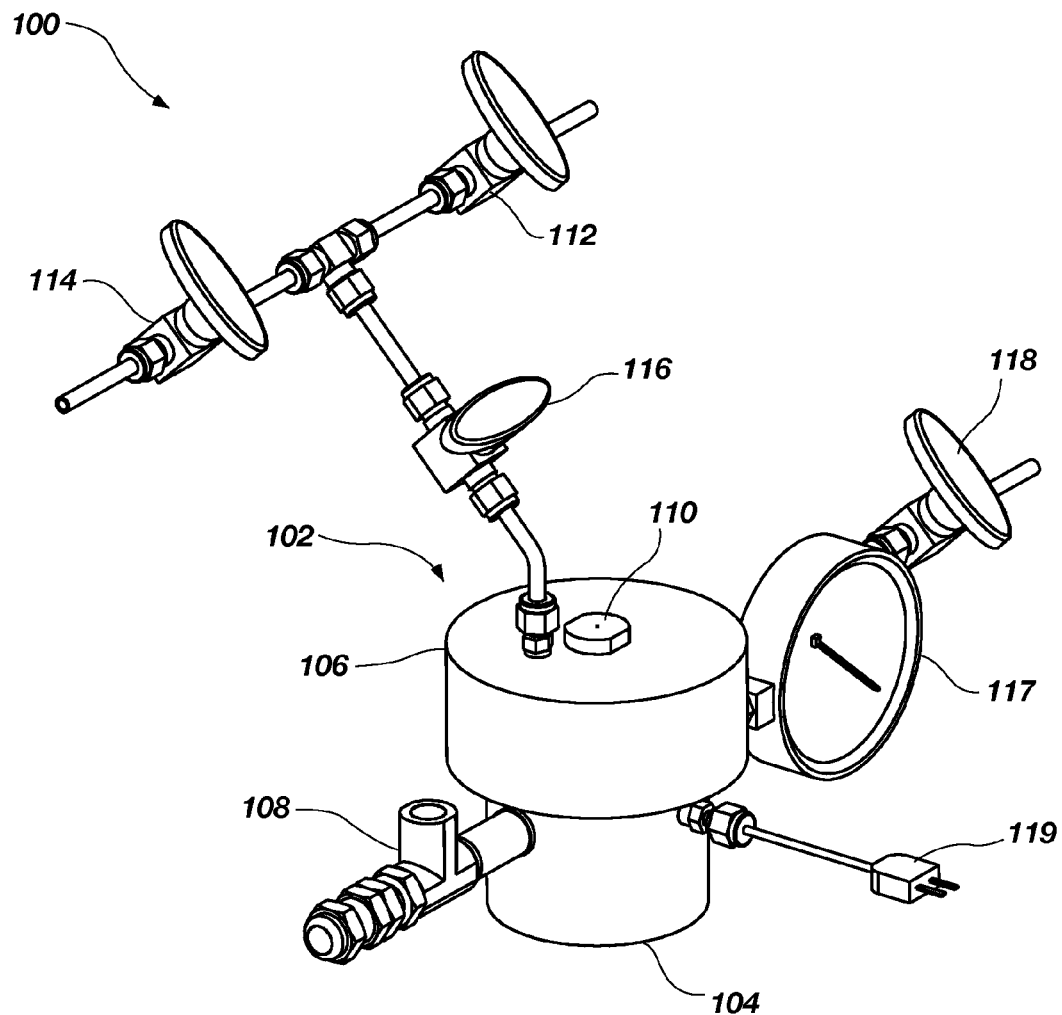
FIGS. 1A through 1C are simplified schematic diagrams illustrating embodiments of a system for producing hydrogen.

A method and system for producing hydrogen, and a system for producing power are provided. The method and systems may utilize a reaction between a hydrogen storage compound, such as ammonia borane, and an oxidizer to produce hydrogen. By way of non-limiting example, the oxidizer may comprise a mixture of water and hydrogen peroxide. The reaction between ammonia borane and the hydrogen peroxide is exothermic and, thus, may be controlled to produce sufficient heat for decomposing ammonia borane in the absence of an external heat source. By utilizing the exothermic reaction of ammonia borane and hydrogen peroxide to produce hydrogen and heat for thermally decomposing ammonia borane, ammonia borane may be safely and efficiently utilized as a high gravimetric and volumetric density source of hydrogen. As a non-limiting example, the hydrogen may be stored as ammonia borane and may be released both by reacting the ammonia borane with the oxidizer and by thermally decomposing the ammonia borane. In some embodiments, the oxidizer may be a solution including a mixture of hydrogen peroxide and water, and may be introduced to the ammonia borane as needed to produce hydrogen and sufficient heat to initiate decomposition of at least a portion of the unreacted ammonia borane. The hydrogen generated may be purified to render it suitable for power generation using, for example, a fuel cell.

Methods of producing hydrogen include reacting ammonia borane with an oxidizer, such as hydrogen peroxide. In some embodiments, the ammonia borane may be mixed with a metal, a metal hydride, or a combination thereof. For example, the oxidizer may include a mixture of hydrogen peroxide and water, which may react with ammonia borane to produce hydrogen and heat. The ammonia borane and hydrogen peroxide may react to produce hydrogen according to Reaction 1a:

$$4H_3NBH_3 + 3H_2O_2 15H_2 + 2N_2 + 2B_2O_3 \quad \text{(Reaction 1a)}$$

Hydrogen may be produced by the reaction between ammonia borane and water according to Reaction 1b:

$$H_3NBH_3 + 3H_2O \rightarrow 3H_2 + NH_3 + H_3BO_3 \quad \text{(Reaction 1b)}$$

Additionally, the ammonia borane may be mixed with a metal, such as aluminum or magnesium, or a metal hydride. As used herein, the term "metal hydride" means and includes any compound including a metal and hydrogen, such as, for example, magnesium hydride ($MgH_2$), lithium hydride (LiH), sodium hydride (NaH), potassium hydride (KB) and titanium hydride ($TiH_2$). Additional hydrogen may be produced by reaction of the metal hydrides with water from the mixture of hydrogen peroxide and water.

Heat produced during the reaction between ammonia borane and hydrogen peroxide (Reaction 1a) may be used to thermally decompose unreacted ammonia borane. The unreacted ammonia borane may thermally decompose according to Reactions 2a through 2d:

$$H_3NBH_3 \rightarrow 3H_2BN \quad \text{(Reaction 2a)}$$

$$H_3NBH_3 \rightarrow H_2 + H_2NBH_2 \quad \text{(Reaction 2b)}$$

$$H_2NBH_2 \rightarrow H_2 + HNBH \quad \text{(Reaction 2c)}$$

$$HNBH \rightarrow H_2 + BN \quad \text{(Reaction 2d)}$$

Optionally, a catalyst may be used to facilitate the reaction of ammonia borane with the oxidizer. As used herein, the term "catalyst" means and includes a substance capable of initiating or accelerating a chemical reaction, such as unreacted ammonia borane with hydrogen peroxide. The catalyst may include, for example, a ferric catalyst (i.e., iron (III) oxide ($Fe_2O_3$)), a carbon-supported metal catalyst, a noble metal catalyst, manganese oxide (MnO), neodymium oxide ($Nd_2O_3$), ruthenium, or combinations thereof.

The hydrogen produced during the process of reacting ammonia borane with the oxidizer, as well as by thermal decomposition of ammonia borane, may be purified to remove byproducts of the reaction, such as ammonia.

The hydrolysis of the unreacted ammonia borane may further be increased by adjusting the pH of a solution during the reaction. By way of non-limiting example, if the oxidizer is a mixture of hydrogen peroxide and water, the pH of the mixture may be adjusted to control a rate of hydrolysis of the unreacted ammonia borane. Using a catalyst or adjusting the pH to increase hydrolysis of the unreacted ammonia borane may facilitate increased hydrogen yields.

The system for producing hydrogen may include a reactor for reacting ammonia borane and the oxidizer. Additionally, the system may include an arrangement for introducing the oxidizer to ammonia borane in an amount sufficient to produce the desired hydrogen output and to generate sufficient heat to initiate thermal decomposition of unreacted ammonia borane. For example, the reactor may include a sample container for storing ammonia borane and an input for introducing the oxidizer, such as a mixture of water and hydrogen peroxide, to the ammonia borane. The amount of oxidizer introduced into the reactor may be controlled to produce a desired amount of hydrogen and heat. The high gravimetric hydrogen yield derived from the reaction of ammonia borane with an oxidizer, such as hydrogen peroxide, and the thermal decomposition of unreacted ammonia borane provides advantages over existing systems. Specifically, using the oxidizer to produce hydrogen while creating heat for initiating thermal decomposition of unreacted ammonia borane provides a clean, high-purity hydrogen source. The system enables hydrogen to be produced using a small amount of ammonia borane and provides a portable system while substantially reducing the production of undesirable byproducts. A power generation system that includes hydrogen-producing components and a fuel cell for converting hydrogen to electrical energy is also provided. The high hydrogen density of the ammonia borane provides high gravimetric and volumetric energy density.

An example embodiment of a system 100 for producing hydrogen is shown in the simplified schematic diagram illustrated in FIG. 1A. The system 100 includes an apparatus, such as reactor 102, which may form or include a housing (not shown) for storing unreacted ammonia borane, as described in further detail hereinbelow. As a non-limiting example, the reactor 102 may include a body 104, a cover 106, and an aperture 110 for introducing an oxidizer to the ammonia borane. The aperture 110 may be, for example, positioned in the cover 106, and may be sized and configured to enable an instrument (not shown), such as a syringe, to be inserted into the reactor 102 so that the oxidizer may be injected into the ammonia borane contained therein. By way of non-limiting example, the oxidizer may include hydrogen peroxide, ammonia perchlorate, ammonium permanganate, barium peroxide, bromine, calcium chlorate, calcium hypochlorite, chlorine trifluoride, chromic acid, chromium trioxide, dibenzoyl peroxide, dinitrogen trioxide, fluorine, magnesium peroxide, perchloric acid, picric acid, potassium bromate, potassium chlorate, potassium peroxide, propyl nitrate, sodium chlorate, sodium chlorite, sodium perchlorate, sodium peroxide, and mixtures thereof.

The reactor 102 may further include an inlet 112 for introducing gases into the reactor 102 and for purging gases out of the reactor 102 as well as an outlet 114 for relieving pressure within the reactor 102. For example, prior to introducing the oxidizer to the ammonia borane within the reactor 102, the reactor 102 may be flushed or purged from about one (1) to about five (5) times by introducing an inert gas, such as helium, into the reactor 102 through the inlet 112, and by releasing at least a portion of the inert gas through the outlet 114. Additionally, the reactor 102 may be slightly pressurized prior to initiating the reaction between ammonia borane and the oxidizer by introducing a desired amount of an inert gas into the reactor 102 though the inlet 112. The inlet 112 may include a valve 116 by which the introduction of gases into the reactor 102 may be controlled.

As the oxidizer is introduced to the ammonia borane within the reactor 102, hydrogen and heat may be produced. The heat may result in thermal decomposition of unreacted ammonia borane within the reactor 102, producing additional hydrogen. The hydrogen produced by the reaction between ammonia borane and the oxidizer and by the thermal decomposition of ammonia borane is collected within the reactor 102 and may be utilized as needed by passing the hydrogen out of the reactor through the valve 118. Pressure that accumulates in the reactor 102 as a result of the reaction processes may be monitored using a pressure gauge 117 and may be released using a pressure release valve 108. The system 100 may also include a safety pressure relief valve 108 that is set to open at a predetermined pressure to protect the reactor 102 and other equipment from being subjected to pressures that exceed their design limits.

The system 100 may further include an apparatus (not shown) for purifying the hydrogen gas prior to, upon or subsequent to release from the reactor 102. The apparatus may be used to remove byproducts from the hydrogen which may have been produced during the reaction of ammonia borane and the oxidizer and which may have negative effects on power generation such as, for example, ammonia or other nitrogen-containing byproducts. The apparatus may be any device or arrangement known in the art for purifying or separating gases. By way of non-limiting example, the apparatus may be a membrane or an absorbance gas purification system. By removing byproducts from the gas, a hydrogen stream having sufficient purity for use in fuel cells and other applications may be obtained.

Figure 1B:
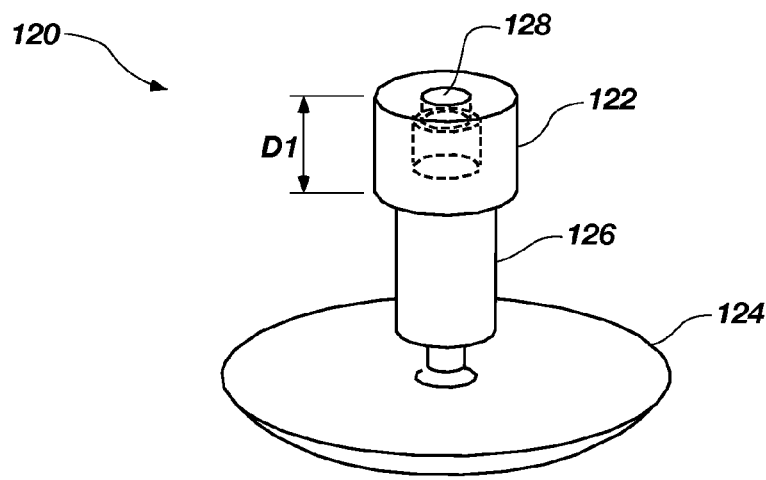

The reactor 102 may further include an arrangement configured for holding or storing the ammonia borane, such as a stand 120, the details of which are shown in FIG. 1B. The stand 120 may include a sample container 122 secured to a base 124 and, optionally, a shaft 126 disposed therebetween. The sample container 122 may be formed from any material suitable for reacting ammonia borane with the oxidizer, such as a metal, and may include a cavity 128, represented by broken lines, formed therein for holding the ammonia borane. By way of non-limiting example, the cavity 128 may extend into the sample container 122 a depth D1 of between about five millimeters (5 mm) to about twenty millimeters (20 mm). The cavity 128 may be formed from or lined with a material capable of retaining heat produced during the reaction (i.e., having a low thermal conductivity), such as a ceramic material. As a particular non-limiting example, the sample container 122 may include stainless steel, while the cavity 128 may be lined with alumina, zirconia, or a combination thereof.

Figure 1C:
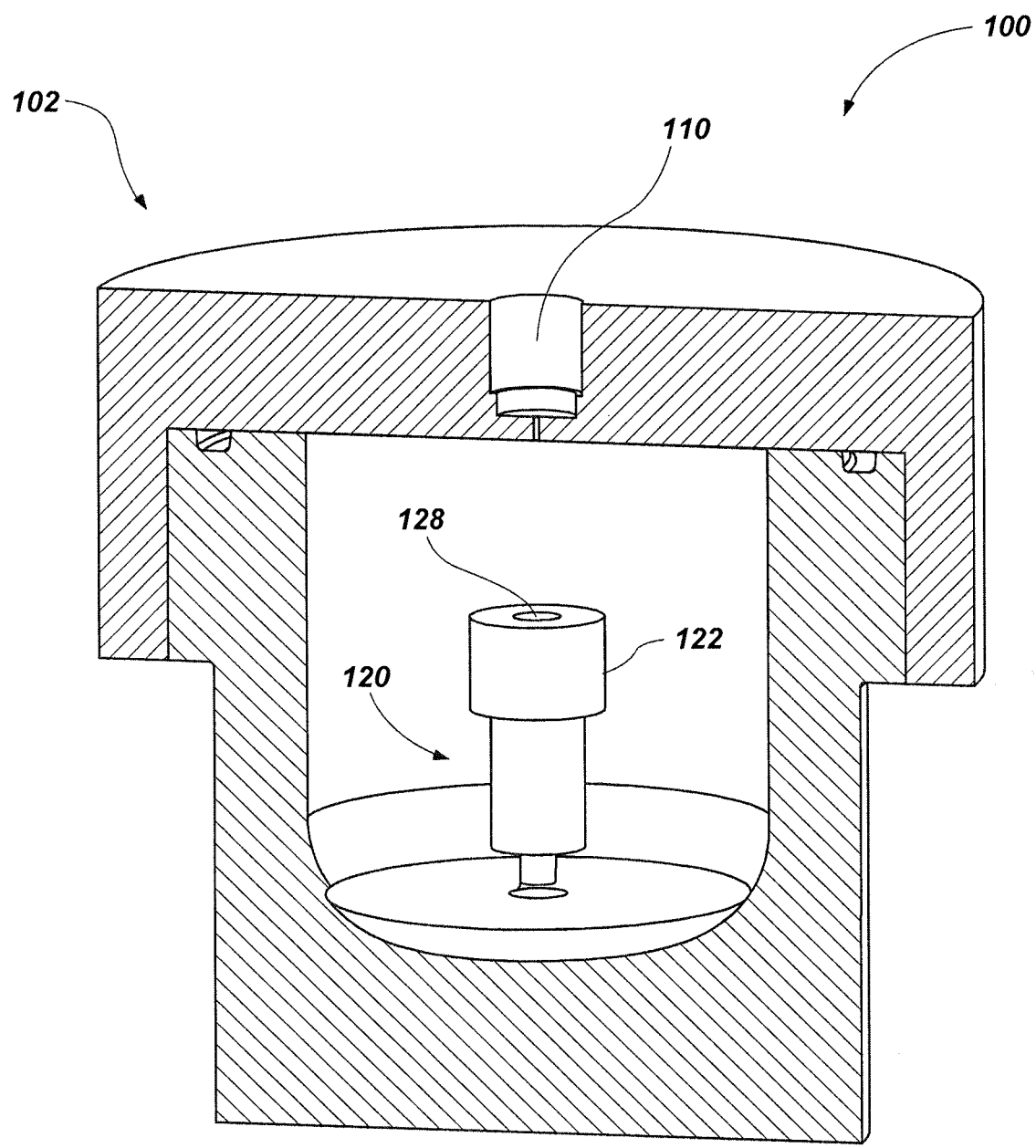

The stand 120 may be sized and configured to be positioned within the reactor 102 as shown in FIG. 1C, which is a partial cross-sectional view of the reactor 102 having the stand 120 therein. The sample container 122 may be aligned with the aperture 110 so that the oxidizer introduced through the aperture 110 may be readily contacted with the ammonia borane stored in the cavity 128. As a non-limiting example, the oxidizer may be introduced into the reactor 102 by way of a syringe (not shown) that may be inserted into the reactor 102 through the aperture 110.

By way of non-limiting example, the oxidizer introduced to the ammonia borane in the sample container 122 may include hydrogen peroxide or a mixture of hydrogen peroxide and 3:7 and water at a ratio of between about 3:7 and about 10:0, and more particularly about 1:1 (i.e., "50% hydrogen peroxide"). Ammonia borane may be provided, for example, as a powder material, a particulate material or as a slurry. Contacting the ammonia borane with the oxidizer may initiate a reaction between the ammonia borane and the oxidizer to produce hydrogen and heat. For example, reacting ammonia borane with a mixture of hydrogen peroxide and water may produce hydrogen according to Reactions 1a and 1b shown above.

Since the overall reaction between ammonia borane and hydrogen peroxide (Reaction 1a) is exothermic, the reaction may be controlled via introduction of the oxidizer to produce an amount of heat sufficient to initiate thermal decomposition of unreacted ammonia borane within the reactor 102. Heat generation within the reactor 102 may be monitored, for example, using a thermocouple 119 (FIG. 1A). For example, the oxidizer may be a solution including a 1:1 ratio of water to hydrogen peroxide and may be introduced into the reactor 102 such that a ratio of the oxidizer to ammonia borane (i.e., the "oxidizer-to-fuel ratio") may be from about four-tenths (0.4) to about one and two-tenths (1.2), and more particularly from about six-tenths (0.6) to about eight-tenths (0.8). Once sufficient heat has been produced inside the reactor 102 by reacting ammonia borane with the oxidizer, unreacted ammonia borane may begin to thermally decompose to produce additional hydrogen according to Reactions 2a through 2d shown above.

Thermal decomposition of ammonia borane may begin to occur when the temperature within the reactor 102 reaches between about eighty-five degrees Celsius (85° C.) and about one-hundred fifty degrees Celsius (150° C.), and more particularly about one-hundred ten degrees Celsius (110° C.), to produce hydrogen. In this way, the heat produced by exothermically reacting ammonia borane with hydrogen peroxide results in hydrogen production in the absence of a catalyst or an external heat source. The amount of oxidizer contacted with ammonia borane within the reactor 102 may be controlled to reach a desired temperature for thermally decomposing ammonia borane.

The thermal decomposition of ammonia borane provides a substantially increased hydrogen yield (i.e., mass fraction hydrogen per total mass), which increases the hydrogen-producing capabilities of the reactor 102.

The system 100 shown in FIG. 1A may be integrated with one or more fuel cells (not shown), such as a proton exchange membrane fuel cell (PEMFC) or a solid-oxide fuel cell (SOFC), to form a system for producing energy. Hydrogen produced using the system 100 may be introduced to an anode of the fuel cells using a suitable piping arrangement. At the anode, the hydrogen yields electrons, which travel through an external circuit toward a cathode to produce an electrical current.

The following examples serve to illustrate embodiments of the present invention in more detail. These examples are not to be construed as being exhaustive or exclusive as to the scope of this invention.

EXAMPLES

Example 1

Ammonia borane powder, which is commercially available from RTI International (Research Triangle Park, N.C.) or Sigma-Aldrich Co. (St. Louis, MO) was weighed in amounts in a range of from about 1 mg to about 30 mg in stainless steel or ceramic pans, and was reacted with from about one (1) µL to about thirty (30) µL of an oxidizer in a 0.20 L stainless steel reactor. The oxidizer included a mixture of hydrogen peroxide and water at a ratio of 1:1 (i.e., 50% hydrogen peroxide).

About twenty-two (22) mg of ammonia borane powder was reacted with various amounts of 50% hydrogen peroxide in a system similar to or identical to the system 100 shown in FIGS. 1A through 1C. The reactions were performed using a ratio of the 50% hydrogen peroxide to the ammonia borane of between about six-tenths (0.6) and about one and three-tenths (1.3), which provided a hydrogen percentage of between about 5 wt % and about 9 wt %.

Figure 2:
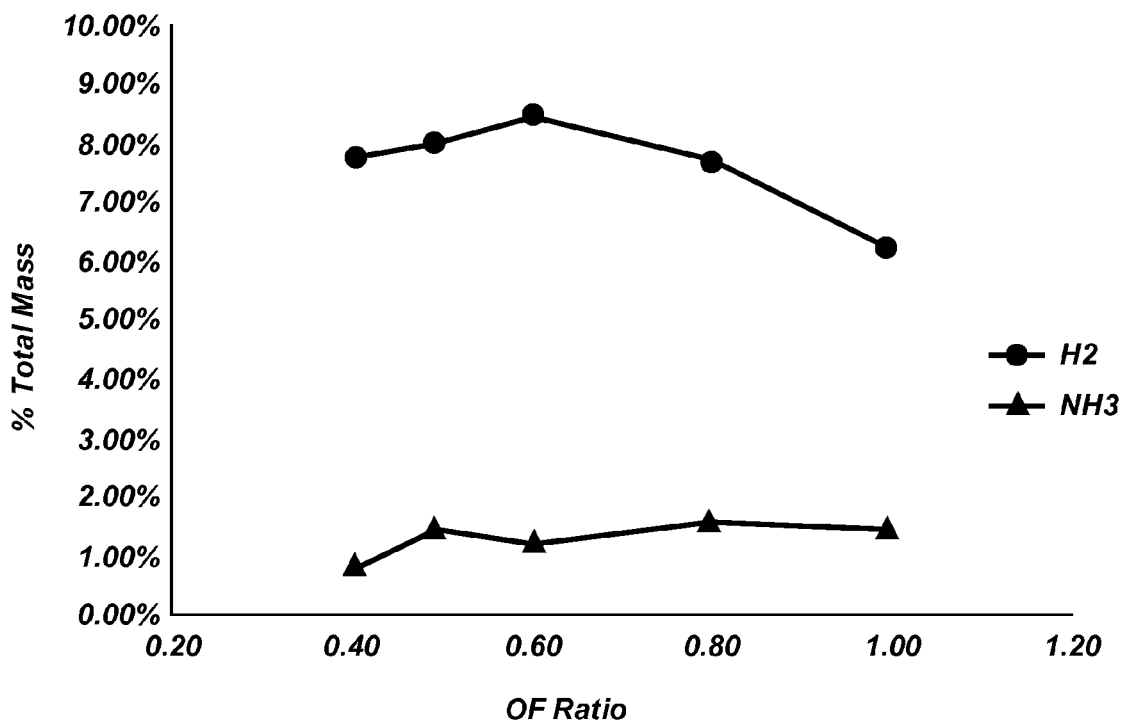
FIG. 2 is a plot showing hydrogen weight percentage (wt %) obtained as a function of a ratio of oxidizer to fuel used to react ammonia borane with hydrogen peroxide.

During the reaction, the temperature within the reactors was about 100° C., which is within the temperature range at which thermal decomposition of ammonia borane occurs (between about 85° C. to about 150° C.). Gas chromatography was used to analyze the gas inside the reactor and to determine hydrogen yields (wt %) resulting from the reaction between ammonia borane and the oxidizer including a 1:1 volumetric ratio of water to hydrogen peroxide was determined. The hydrogen yield obtained using various ratios of the oxidizer to the ammonia borane are shown in FIG. 2. As illustrated in FIG. 2, the hydrogen yield decreased as the ratio of the oxidizer to the ammonia borane was increased.

After reacting ammonia borane with the oxidizer, a white residue was left dispersed on the inside surfaces of the reactor. FTIR (Fourier Transform Infrared) Spectroscopy was used to analyze the white residue, which showed a characteristic signal of ammonia borane and other borane compounds. While not wishing to be bound by theory, it is believed that the fine dispersion of ammonia borane in the reactor indicates that a portion of the unreacted ammonia borane was ejected out of the sample container during the reaction due to the abrupt exothermic reaction of ammonia borane with hydrogen peroxide.

As shown in FIG. 2, utilizing the oxidizer to ammonia borane ratio of about six-tenths (0.6) by weight provides the highest hydrogen yield. Furthermore, it has been shown that increasing the amount of oxidizer may decrease hydrogen yield. While not wishing to be bound by theory, it is believed that increased amounts of oxidizer increases the amount of ammonia borane expelled out of the sample container before reacting with the oxidizer. The faster reaction may also prevent efficient thermal decomposition of unreacted ammonia borane.

Figure 3:
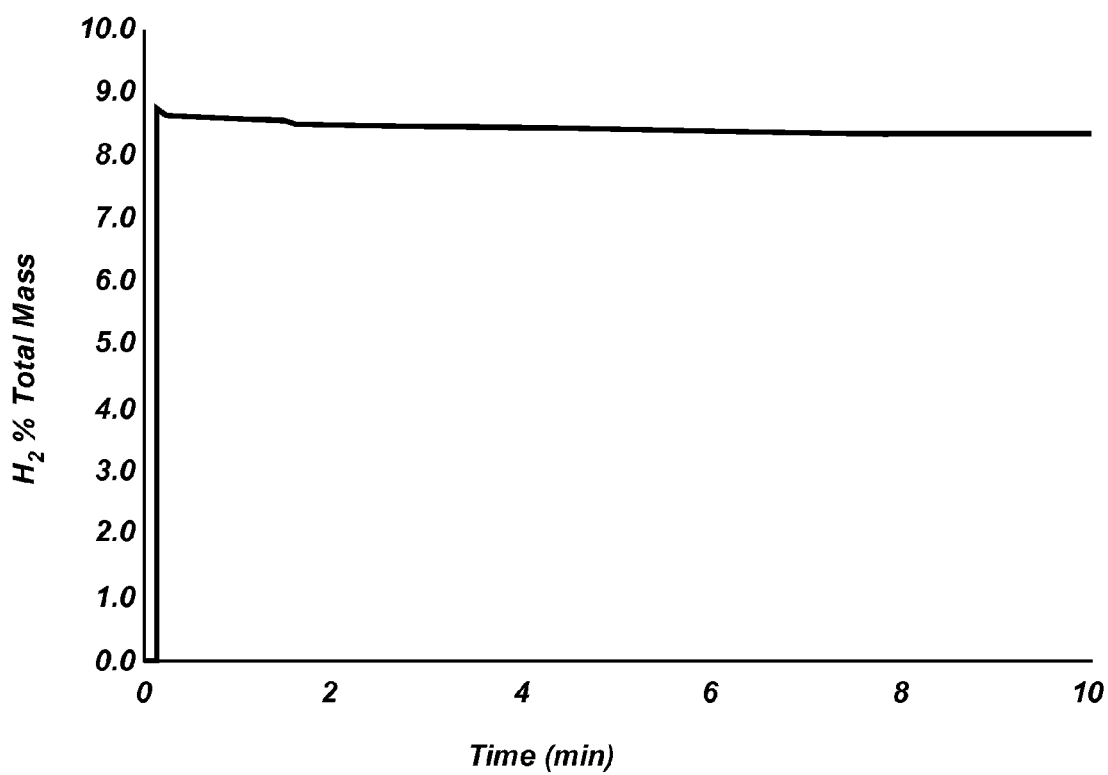
FIG. 3 is a plot showing an increase in hydrogen weight percentage (wt %) upon introducing hydrogen peroxide, as an oxidizer, to ammonia borane.

FIG. 3 illustrates an increase in hydrogen production after injection of the 50% hydrogen peroxide. About eleven (11) µL of 50% hydrogen peroxide was manually added at about zero minutes to the twenty-two (22) mg ammonia borane, so that the OF ratio was about six-tenths (0.6). As shown in FIG. 3, after a short induction time the weight percentage of hydrogen produced dramatically increased upon addition of the 50% hydrogen peroxide demonstrating that the 50% hydrogen peroxide efficiently reacts with and releases hydrogen from ammonia borane.

Thus, the reactions produced a high gravimetric hydrogen yield without the need for a catalyst or an external heat source, such as an igniter. Based on the results, the reaction of ammonia borane with hydrogen peroxide is a suitable candidate for on-demand hydrogen storage and production systems. The reaction is exothermic, providing hydrogen production of about ten-percent (10%) by weight at low stoichiometric ratios of hydrogen peroxide to ammonia borane (i.e., OF ratios). A high gravimetric hydrogen yield may be derived from the reaction of ammonia borane with hydrogen peroxide and the thermal decomposition of unreacted ammonia borane. The system described herein, which is based on the reaction of ammonia borane with hydrogen peroxide, may provide several advantages over conventional systems of hydrogen production. For example, the system does not require an igniter, chemical heat source, or catalyst to initiate the thermal decomposition of ammonia borane and, thus, does not generate unwanted byproducts. Further, the system provides a substantially increased hydrogen gravimetric content compared to conventional systems, such as those based on the catalytic reaction of sodium borohydride with water (about 4 wt %).

Example 2

Figure 4:
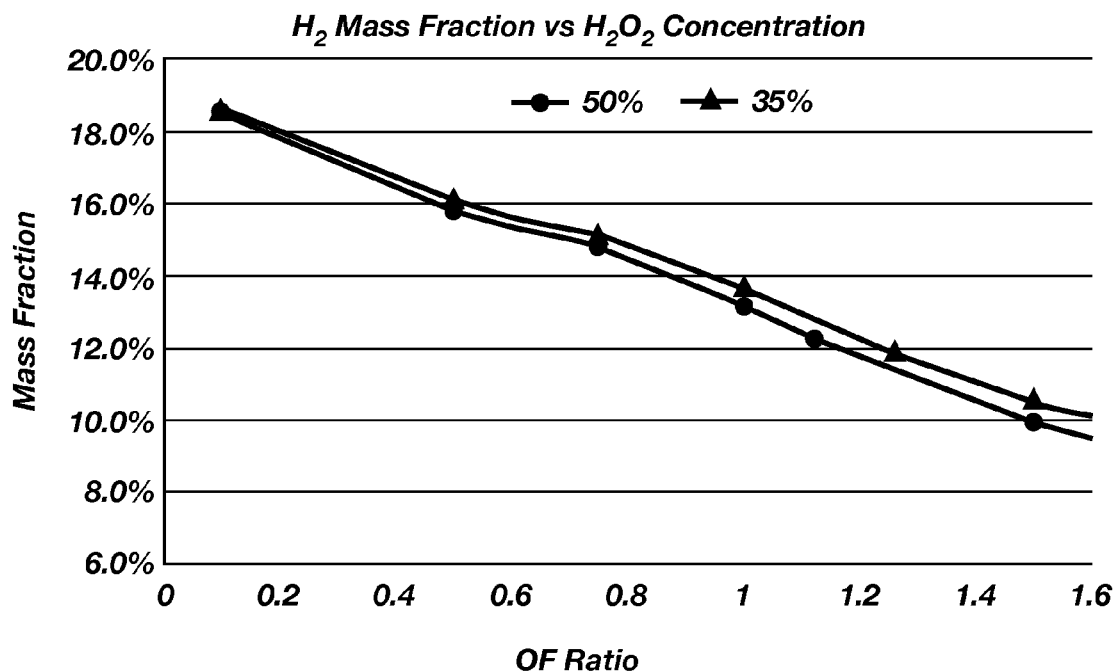
FIG. 4 is a plot showing a theoretical hydrogen percentage obtained by reacting various ratios of oxidizer to ammonia borane, wherein the oxidizer includes a mixture of water to hydrogen peroxide at a ratio of 1:1 (50% hydrogen peroxide) and a ratio of 20:7 (35% hydrogen peroxide)

Theoretical results for the weight percent of hydrogen produced by reacting ammonia borane with an oxidizer including water and hydrogen at a ratio of 1:1 (50% hydrogen peroxide by volume) and at a ratio of 20:7 (35% hydrogen peroxide by volume) were obtained executing the computer program Chemical Equilibrium with Applications, which is available from NASA (Washington, D.C.). The theoretical hydrogen weight percentage was generated using ratios of the oxidizer to ammonia borane ("OF ratio") between about 0.1 to about 2.58. The theoretical hydrogen weight percentages (wt %) generated using the Chemical Equilibrium with Application program are shown in FIG. 4.

Under certain conditions, reacting ammonia borane, water and hydrogen peroxide may provide a mass fraction of hydrogen of over 18%. The thermal decomposition of ammonia borane may produce a substantially increased hydrogen yield in comparison to the reactions of ammonia borane with water and hydrogen peroxide. Utilizing the heat produced by reacting ammonia borane with a strong oxidizer, such as hydrogen peroxide, to initiate and sustain thermal decomposition of ammonia borane may provide substantially increased hydrogen yields.

Example 3

About twenty-two (22) mg of ammonia borane powder, which is commercially available from RTI International (Research Triangle Park, N.C.) Sigma-Aldrich Co. (St. Louis, MO), was placed in reactors of a system similar or identical to the reactor shown in FIGS. 1A-1C. A 50% hydrogen peroxide solution was manually injected into the reactor to introduce the hydrogen peroxide to the ammonia borane.

Figure 5:
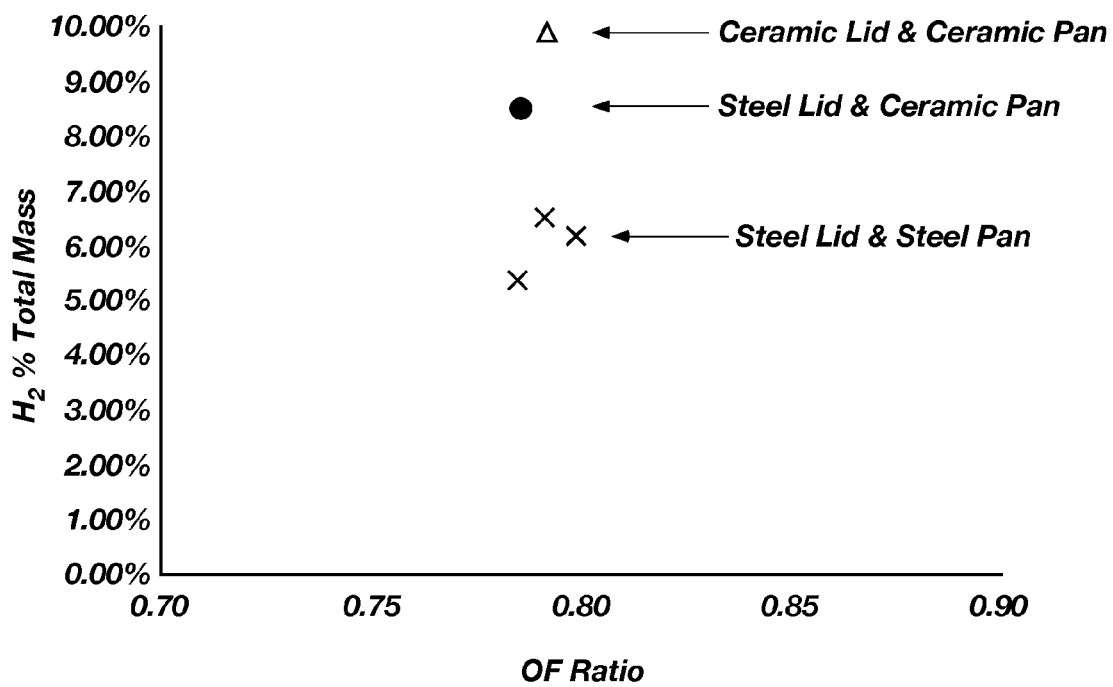
FIG. 5 is a plot showing variation in hydrogen percentage generated at a constant oxidizer to fuel ratio performed in reactors of the present invention including various materials.

FIG. 5 is a plot illustrating the hydrogen weight percentage (wt %) produced by reacting the 50% hydrogen peroxide with ammonia borane. The reactions were performed using a ratio of 50% hydrogen peroxide to an ammonia borane ("OF ratio") of about 0.8. Three types of sample containers were used to perform the reactions, one including a ceramic body and a stainless steel lid (which is represented in FIG. 5 as ●), another including a ceramic body (or "pan") and a ceramic lid (which is represented in FIG. 5 as Δ), and a third including a stainless steel body and a stainless steel lid (which is represented in FIG. 5 as X). As shown in FIG. 5, the hydrogen yield was substantially increased by reacting the ammonia borane with hydrogen peroxide and water in the reactor having the ceramic body and the ceramic cover. While not wishing to be bound by any particular theory, it is believed that the capability of the ceramic material to retain heat produced during the exothermic reaction of ammonia borane and hydrogen peroxide facilitates the thermal decomposition of hydrogen-dense ammonia borane. Accordingly, performing the reaction within a reactor including a material having a low thermal conductivity may substantially increase the hydrogen yield and provide the highest overall system efficiency.

While the invention may be susceptible to various modifications and alternative forms, specific embodiments have been shown by way of example in the drawings and have been described in detail herein. However, it should be understood that the invention is not limited to the particular forms disclosed. Rather, the invention encompasses all modifications, variations and alternatives that could be contemplated by one of skill in the art.

What is claimed is:

1. A method for producing hydrogen, comprising:
    introducing an inert gas into a reactor through an inlet of the reactor;
    introducing an oxidizer through an aperture of the reactor separate from the inlet of the reactor, the aperture aligned with an arrangement within a cavity of the reactor;
    reacting ammonia borane contained in the arrangement with the oxidizer to produce hydrogen and heat;
    exposing unreacted ammonia borane to the heat produced by reacting the ammonia borane with the oxidizer to decompose at least a portion of the unreacted ammonia borane to produce additional hydrogen; and
    recovering the produced hydrogen and the additional produced hydrogen through an outlet of the reactor separate from the aperture of the reactor.

2. The method of claim 1, wherein reacting ammonia borane contained in the arrangement with the oxidizer comprises reacting a portion of the ammonia borane with a mixture of hydrogen peroxide and water.

3. The method of claim 2, wherein reacting a portion of the ammonia borane with a mixture of hydrogen peroxide and water comprises reacting the ammonia borane with the mixture of hydrogen peroxide and water at a volumetric ratio within a range of from about 30:70 to about 90:10.

4. The method of claim 3, wherein reacting the ammonia borane with the mixture of hydrogen peroxide and water at a volumetric ratio within a range of from about 30:70 to about 90:10 comprises reacting the mixture of hydrogen peroxide and water and the ammonia borane at a ratio within a range of from about 0.4:1 to about 1.2:1.

5. The method of claim 1, wherein reacting ammonia borane contained in the arrangement with the oxidizer to produce hydrogen and heat comprises controlling an amount of the oxidizer introduced to the ammonia borane to reach a temperature greater than about 85° C.

6. The method of claim 1, wherein exposing unreacted ammonia borane to the heat occurs simultaneously with reacting the ammonia borane with the oxidizer.

7. A method for producing hydrogen, comprising:
    purging a reactor with a gas introduced into the reactor through an inlet of the reactor;
    introducing an oxidizer through an aperture of a reactor, the aperture separate from the inlet and aligned with an arrangement containing ammonia borane within a cavity of the reactor;
    reacting the oxidizer with the ammonia borane to produce hydrogen and heat;
    retaining the heat produced by reacting the ammonia borane and the oxidizer to thermally decompose at least a portion of unreacted ammonia borane to produce additional hydrogen; and
    recovering the produced hydrogen and the additional produced hydrogen through an outlet of the reactor separate from the aperture of the reactor.

8. The method of claim 7, wherein introducing the oxidizer through an aperture of a reactor comprises:
    inserting an instrument into the aperture; and
    injecting a mixture of water and hydrogen peroxide into the cavity of the reactor using the instrument.

9. The method of claim 7, wherein reacting the oxidizer with the ammonia borane comprises reacting the oxidizer with the ammonia borane contained in the arrangement in an amount sufficient to produce heat to reach a temperature greater than about 85° C.

10. The method of claim 7, wherein retaining the heat produced by reacting the ammonia borane and the oxidizer to thermally decompose at least a portion of unreacted ammonia borane comprises decomposing the at least a portion of the unreacted ammonia borane in a ceramic container of the arrangement.

11. The method of claim 7, further comprising mixing the ammonia borane with at least one of a metal or a metal hydride prior to reacting the oxidizer with the ammonia borane to increase hydrogen production.

12. The method of claim 7, further comprising adjusting pH while reacting the oxidizer with the ammonia borane to control hydrogen production by hydrolysis of unreacted ammonia borane.

13. A system for producing hydrogen, comprising:
    a reactor configured for reacting ammonia borane and an oxidizer to produce hydrogen and heat, the reactor comprising:
        a cavity;
        an aperture configured for introducing the oxidizer into the cavity;
        an inlet separate from the aperture and configured for introducing gases into the reactor; and
        an outlet separate from the aperture and configured for releasing evolved hydrogen from the reactor; and
    an arrangement within the cavity of the reactor and comprising a container aligned with the aperture of the reactor, the container configured for storing the ammonia borane and for retaining an amount of the heat produced by reacting the ammonia borane with the oxidizer sufficient to decompose unreacted ammonia borane.

14. The system of claim 13, wherein the container of the arrangement comprises a metal, a ceramic material, or a combination thereof.

15. The system of claim 13, wherein the aperture of the reactor is positioned over and centrally-aligned with the container of the arrangement.

16. The system of claim 13, further comprising an instrument configured to be inserted into the aperture of the reactor to introduce the oxidizer into the ammonia borane stored within the container of the arrangement.

17. The system of claim 13, wherein the oxidizer comprises a mixture of water and hydrogen peroxide.

18. The system of claim 13, further comprising an apparatus for removing byproducts from the hydrogen.

19. The system of claim 13, wherein the arrangement further comprises a shaft securing the container to a base.

20. The system of claim 13, wherein the container of the arrangement comprises alumina, zirconia, or a combination thereof.

21. The system of claim 13, wherein a cavity defined by the container of the arrangement has a depth within a range of from about five millimeters to about twenty millimeters.

22. The system of claim 13, wherein the reactor is configured to produce the hydrogen and the heat in the absence of an external heat source and a catalyst.

23. A system for producing power, comprising:
   a reactor configured for producing hydrogen and heat from ammonia borane and an oxidizer, the reactor comprising:
      an inlet configured for introducing inert gases into the reactor and for releasing at least a portion of the inert gases from the reactor;
      an aperture configured for introducing the oxidizer into the reactor; and
      an outlet configured for releasing the produced hydrogen from the reactor;
   an arrangement within the reactor and configured to store the ammonia borane for reaction with the oxidizer and to sufficiently retain the produced heat to thermally decompose unreacted ammonia borane; and
   at least one apparatus for reacting the produced hydrogen with oxygen to produce power, the at least one apparatus comprising a gas purification system and a fuel cell.

24. The system of claim 23, wherein the arrangement comprises a ceramic container having a cavity aligned with the aperture of the reactor.

* * * * *